United States Patent [19]
Van Huben et al.

[11] Patent Number: 5,966,707
[45] Date of Patent: Oct. 12, 1999

[54] METHOD FOR MANAGING A PLURALITY OF DATA PROCESSES RESIDING IN HETEROGENEOUS DATA REPOSITORIES

[75] Inventors: Gary Alan Van Huben; Joseph Lawrence Mueller, both of Poughkeepsie, N.Y.

[73] Assignee: International Business Machines Corporation, Armonk, N.Y.

[21] Appl. No.: 08/982,724

[22] Filed: Dec. 2, 1997

[51] Int. Cl.[6] .................................................. G06F 15/163
[52] U.S. Cl. .............................. 707/10; 707/8; 707/102; 707/200; 395/200.31; 395/682; 395/840; 395/849
[58] Field of Search .................................. 707/10, 8, 102, 707/200; 395/200.31, 200.53, 840, 849, 682

[56] References Cited

U.S. PATENT DOCUMENTS

| | | | |
|---|---|---|---|
| 5,191,534 | 3/1993 | Orr et al. | 364/468 |
| 5,201,047 | 4/1993 | Maki et al. | 707/4 |
| 5,216,612 | 6/1993 | Cornett et al. | 364/468 |
| 5,295,222 | 3/1994 | Wadhwa et al. | 395/1 |
| 5,317,729 | 5/1994 | Mukherjee et al. | 395/600 |
| 5,321,605 | 6/1994 | Chapman et al. | 705/7 |
| 5,333,312 | 7/1994 | Wang | 707/10 |
| 5,333,315 | 7/1994 | Saether et al. | 707/1 |
| 5,333,316 | 7/1994 | Champagne et al. | 707/8 |
| 5,418,949 | 5/1995 | Suzuki | 707/205 |
| 5,463,555 | 10/1995 | Ward et al. | 364/468 |
| 5,473,608 | 12/1995 | Gagne et al. | 370/401 |
| 5,530,857 | 6/1996 | Gimza | 395/600 |
| 5,535,322 | 7/1996 | Hecht | 395/155 |
| 5,544,051 | 8/1996 | Senn et al. | 364/419.19 |
| 5,586,039 | 12/1996 | Hirsch et al. | 364/468.01 |
| 5,668,958 | 9/1997 | Bendert et al. | 710/128 |
| 5,752,247 | 5/1998 | Henderson | 707/102 |
| 5,787,437 | 7/1998 | Potterveld et al. | 707/103 |
| 5,805,899 | 9/1998 | Evans et al. | 395/712 |
| 5,809,497 | 9/1998 | Freund et al. | 707/2 |
| 5,812,130 | 9/1998 | Van Huben et al. | 345/339 |
| 5,905,987 | 5/1999 | Shutt et al. | 707/103 |

OTHER PUBLICATIONS

"Beyond EDA" by Mike Robinson, Electronic Business, vol. 19, No. 6, Jun. 1993, pp. 42–46.
"Integrating Human Knowledge Into The Product Development Process" by Oliver Tegel, Engineering Data Management: Integrating the Engineering Enterprise ASME 1994, pp. 93–100.

*Primary Examiner*—Jean R. Homere
*Attorney, Agent, or Firm*—Lynn L. Augspurger

[57] ABSTRACT

A Data Management System has a plurality of data managers and is provided with a plurality of data managers in one or more layers of a layered architecture The system performs with a data manager and with a user input via an API a plurality of processss on data residing in heterogeneous data repositories of the computer system including promotion, check-in, check-out, locking, library searching, setting and viewing process results, tracking aggregations, and managing parts, releases and problem fix data under management control of a virtual control reposisitory having one or more physical heterogeneous repositories. The system provides for storing, accessing, tracking data residing in the one or more data repositories managed by the virtual control repository. User Interfaces provide a combination of command line, scripts, GUI, Menu, WebBrowser maps of the user's view to a PFVL paradigm. Configurable Managers include a query control repository for existence of peer managers and provide logic switches to dynamically interact with peers. A control repository layer provides a common process interface across all managers data view maps to a relational table paradigm and maps control repository layer (CRL) calls to sequences of SQL queries. A command translator for a relations data base provides pass through of SQL queries. Table files map SQL Queries into a set of FILE I/O's with appropriate inter I/O processing, and meta data maps SQL Queries into Meta data API calls with appropriate inter I/O processing. PFVL paradigm calls are mapped into DataManager(s)/Control Repository calls.

14 Claims, 10 Drawing Sheets

23 →

| FILENAME | FILETYPE | PACKAGE | LEVEL | VARIANCE | VERSION |
|---|---|---|---|---|---|
| MPEG | SCHEM | DSGN_LIB | TEST | USB | 1.23 |
| MPEG | SCHEM | DSGN_LIB | TEST | USB | 1.22 |
| MPEG | SCHEM | DSGN_LIB | PROD | USB | 1.04 |
| MPEG | VHDL | DSGN_LIB | PROD | USB | 2.56 |
| MPEG | LAYOUT | CIRCUITS | REL1 | LOW_VLT | 5 |
| MPEG | SCHEM | DSGN_LIB | PROD | PCI | 2.56 |
| BUS_CTL | SCHEM | DSGN_LIB | PROD | PCI | 3.21 |

24 →

| FILENAME | FILETYPE | PACKAGE | LEVEL | VARIANCE | VERSION |
|---|---|---|---|---|---|
| H2OPUMP | SCHEM | COOLING | QA1 | BOTH | 13 |
| MICRCTL | SCHEM | COOLING | QA2 | TAURUS | 4 |
| MICRCTL | LAYOUT | COOLING | QA2 | TAURUS | 21 |
| MICRCTL | LAYOUT | COOLING | QA2 | SABLE | 6 |
| FUEL_INJ | SCHEM | ENGINE | QA1 | BOTH | 16 |
| ROM | UCODE | ENGINE | QA2 | SABLE | 34 |
| ENGINE | SCHEM | ELEMECH | QA2 | SABLE | 26 |

FIG.2B

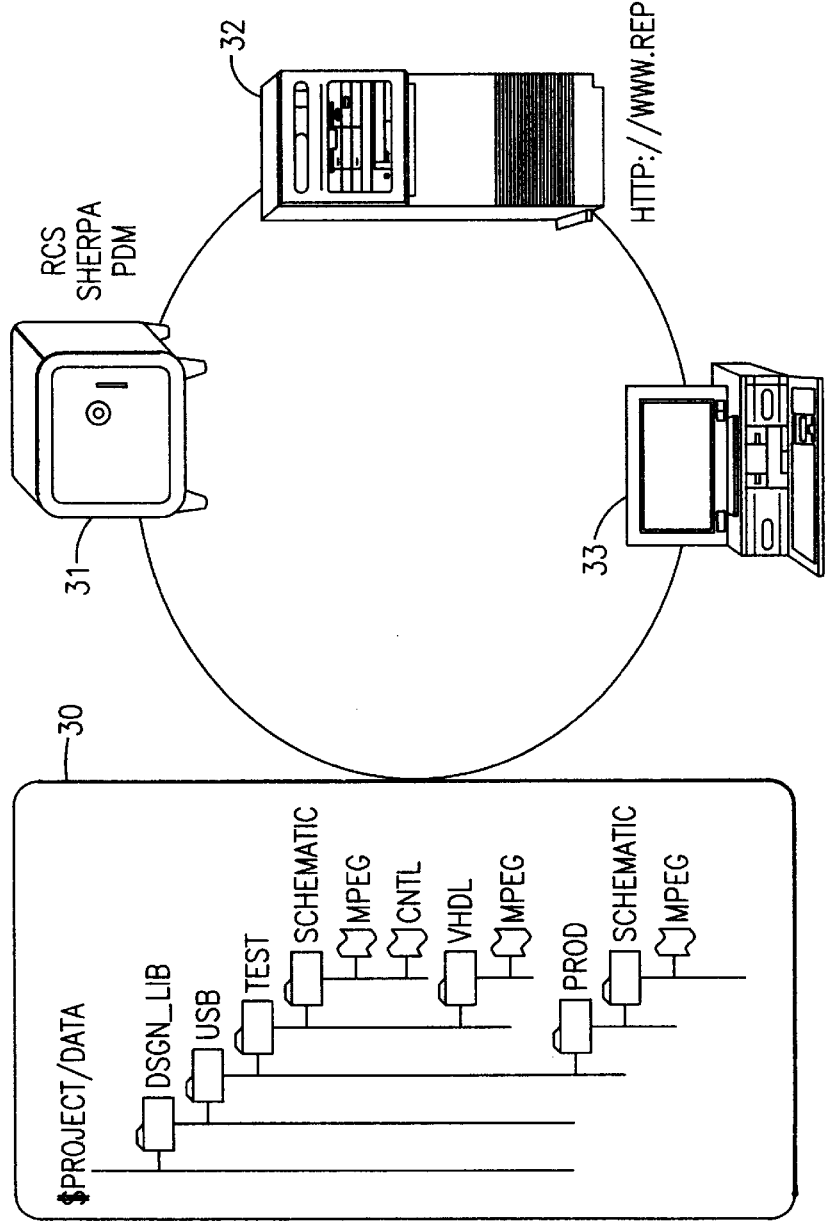

PROMOTE PROCESS (FULL)

| STEP | ROUTINE | GOOD | BAD |
|---|---|---|---|
| 1 | LIBRARY SEARCH | 2 | 12 |
| 2 | FILE EXISTS | 3 | 12 |
| 3 | AUTHORITY CHECK | 4 | 12 |
| 4 | LOCK CHECK | 5 | 12 |
| 5 | PROMOTABLE | 6 | 12 |
| 6 | CRITERIA CHECK | 7 | 12 |
| 7 | PRE PROCESSING | 8 | 12 |
| 8 | FILE MOVE | 9 | 12 |
| 9 | POST PROCESSING | 10 | 12 |
| 10 | NOTIFICATION | 11 | 12 |
| 11 | EXIT | 0 | 0 |
| 12 | ERROR MESSAGE | 0 | 0 |

← 51

PROMOTE PROCESS (NO LIB PROCESSING)

| STEP | ROUTINE | GOOD | BAD |
|---|---|---|---|
| 1 | LIBRARY SEARCH | 2 | 12 |
| 2 | FILE EXISTS | 3 | 12 |
| 3 | AUTHORITY CHECK | 4 | 12 |
| 4 | LOCK CHECK | 5 | 12 |
| 5 | PROMOTABLE | 8 | 12 |
| 6 |  |  |  |
| 7 |  |  |  |
| 8 | FILE MOVE | 10 | 12 |
| 9 |  |  |  |
| 10 | NOTIFICATION | 11 | 12 |
| 11 | EXIT | 0 | 0 |
| 12 | ERROR MESSAGE | 0 | 0 |

PROMOTE PROCESS (NO LIB PROCESSING)

53 →

| STEP | ROUTINE | GOOD | BAD |
|---|---|---|---|
| 1 | LIBRARY SEARCH | 2 | 9 |
| 2 | FILE EXISTS | 3 | 9 |
| 3 | AUTHORITY CHECK | 4 | 9 |
| 4 | LOCK CHECK | 5 | 9 |
| 5 | PROMOTABLE | 6 | 9 |
| 6 | FILE MOVE | 7 | 9 |
| 7 | NOTIFICATION | 8 | 9 |
| 8 | EXIT | 0 | 0 |
| 9 | ERROR MESSAGE | 0 | 0 |

API CALL: SETLOCK MOVE FILE1 TYP2 VARX ENTRY "MODEL BUILD"

82 — STATE TABLE FOR SETLOCK

| 0 | FILE AUTHORITY CHECK | 1 | 3 | AUTHMGR | ← 83 |
|---|---|---|---|---|---|
| 1 | SET LOCK | 2 | 4 | LOCKMGR | ← 84 |
| 2 | EXIT | 0 | 0 | | |
| 3 | ERROR: NOT AUTHORIZED | 2 | 0 | | |
| 4 | ERROR: LOCK SET FAILED | 2 | 0 | | |

FIG.8

AUTHMGR CRI CALL: ⟋—91
    CRIFATGET USERA LOCK MOVE FILE1 TYPE2 VARX ENTRY

SELECT COUNT(*) FROM FILE_AUTHORITY WHERE
        USERID=USERA AND DOMAIND=LOCK AND
92—⟋    NAME=MOVE AND FILENAME=FILE1 AND
        FILETYPE=TYPE2 AND VARIANCE=VARX AND
        LEVEL=ENTRY

LOCKMGR CRI CALL: ⟋—93
    CRILOCKSET USERA LOCK MOVE FILE1 TYPE2 VARX ENTRY
    "MODEL BUILD"

UPDATE REFIDS SET LASTID=LASTID+1
        WHERE TNAME=LOCKS    ⟍—94

SELECT LASTID INTO REF FROM REFIDS
        WHERE TNAME=LOCKS    ⟍—94

INSERT INTO LOCKS  ⟋—94
        (REF, DOMAIN,FILETYPE,VARIANCE,LEVEL,FILENAME,
        LOCKNAME,LOCKERID,DATE,TIME,REASON)
        VALUES(REF,LOCK,TYPE2,VARX,ENTRY,FILE1,MOVE,USERA,
        1996052237,093921,"MODEL BUILD")

METHOD FOR MANAGING A PLURALITY OF DATA PROCESSES RESIDING IN HETEROGENEOUS DATA REPOSITORIES

CROSS REFERENCE TO RELATED APPLICATIONS

The present application claims priority from and is related to the following patent applications: The U.S. patent application Ser. No. 08/761,580 entitled "Data Management System and Method for Concurrent Engineering", filed Dec. 6, 1996, now U.S. Pat. No. 5,812,130, and U.S. patent application Ser. No. 09/240,732 entitled "Method for Shared Data Management Pervasive Computing Environment", filed 01/29/99, and U.S. patent application Ser. No. 08/761,474 entitled PO9-96-008 "Data Management System for Problems, Releases and Parts", filed 12/6/96, now U.S. Pat. No. 5,86,875 and U.S. patent application Ser. No. 08/761,253 entitled "Data Management System and Process", filed 12/6/96, now U.S. Pat. No. 5,878,408, and U.S. patent application Ser. No. 08/761,320 entitled "Data Management System Having Shared Libraries", filed 12/6/96, now U.S. Pat. No. 5,826,265, and U.S. patent application Ser. No. 08/760,913 entitled "Data Management System for File and Database Management", filed 12/6/96, and U.S. patent application Ser. No. 08/761,463 entitled "Data Management Control System for File and Database", filed 12/6/96, and U.S. patent application Ser. No. 08/762,236 entitled "Data Management System Having Data Management Configuration", filed 12/6/96, and U.S. patent application Ser. No. 08/759,692 entitled "Data Management Control System for CDA Applications", filed 12/6/96.

These co-pending applications and the present application are owned by one and the same assignee, International Business Machines Corporation of Armonk, New York.

FIELD OF THE INVENTION

This invention is related to data management systems and managing data objects in a client/server environment where elements of the system may exist on a homogenous computer platform or the elements may be dispersed among a plurality or platforms in a distributed computing environment. Our data management system is particularly useful for use in specialized business solutions which employ our processes and methods, such as for hardware design, software development, inventory tracking, manufacturing, project management, and any related field which necessitates the sharing and tracking of multiple iterations of data objects in a quality controlled environment.

The descriptions set forth in these co-pending applications are hereby incorporated into the present application and we would prefer to implement our present invention within this environment.

BACKGROUND OF THE INVENTION

In the article entitled "Beyond EDA (electronic design automation)", published in Electronic Business Vol.19, No.6 June 1993 P42–46, 48, it was noted that while billions of dollars have been spent over the past (then and still last) five years for electronic design automation systems (EDA) and software to help companies cut their design cycle, a huge gulf remains between design and manufacturing. To eliminate the gull and thus truly comply with the commandments, companies are extending the concept of concurrent engineering to enterprise wide computing. The concept, which calls for integrating all the disciplines from design to manufacturing is becoming the business model of the 1990s. Achieving an enterprise wide vision requires tying together existing systems and programs and managing the data that flows among them. Software that makes that linkage possible is largely in the class known by two names: product data management (PDM) or product information management (PIM). Mr. Robinson, the author, described the experiences of several companies with PIM and PDM, in particular Sherpa and Cadence.

The design of complex parts, such as integrated circuits, computers, or other complex machines in a complete manufacturing operation like IBM's requires computer capability, with computers capable of processing multiple tasks, and allowing concurrent data access by multiple users. The IBM System 390 operating system known as Multiple Virtual Storage (MVS) allows such things as relational database management methods, such as the TIME system described by U.S. Pat. No. 5,333,316, to be used to reduce design time. The TIME system is used within IBM for the purposes described in the patent during circuit design. However, these-prior efforts treated design as directed to an entity and did not achieve the efficiencies provided by the system detailed in our description of our invention, which also can run under MVS, but also under other operating systems. Our detailed description of our invention will illustrate that we have furthered the objects of the invention of 5,333,316 by increasing the flexibility of a number of circuit designers who may concurrently work on designing the same integrated circuit chip and reducing the interference between chip designers. With the prior system, a user (a person, processor or program capable of using data in a relational database) was given a private copy of the master table. Alteration of a row in the user table was not automatically updated in the master table, because a lock mechanism prevented the row update, but that was an great improvement at the time, because no longer did multiple users have to wait for copying of a table, each time data from a user needed to be updated. This row locking and treatment of data has become widespread in the relational database field, and it has been enabled for use with multiple instances of a platform even on Unix machines today. We should note that also in the MVS art, there have been proposed various library systems, e.g. those represented by U.S. Pat. Nos. 5,333,312 and 5,333,315 and others which relate to IBM's Image Object Distribution Manager in the ImagePlus product line of IBM, and IBM's Office Vision are examples of systems enabling control of a source document while allowing access by multiple users. Implementation of these patented ideas enable synchronous and asynchronous copying of a document into a folder in a target library. These methods provide for check out of a document and its placement in a target library while locking the document in the source library to prevent changes while the checked out document is out. But these steps are only some of the many things that are needed to bring a product to a release state. Bringing a product to a release state is an object of the current developments relating to design control in a manufacturing setting.

Concurrent engineering is required among many engineers working in parallel and at different locations worldwide. Furthermore, as noted by Oliver Tegel in "Integrating human knowledge into the product development process" as published in the Proceedings of the ASME Database Symposium, Engineering Data Management: Integrating the Engineering Enterprise ASME Database Symposium 1994. ASCE, New York, N.Y., USA. p 93–100, specialists who are not working directly together are often needed for solving the demanding tasks that arise during the development of today's advanced products. During product development, assistance is required from other departments such as manufacturing, operations scheduling, etc. Even the vendors and customers should be integrated into the product development process to guarantee the product developed will be accepted in the market.

There is a need for integrators/coordinators/model builders and the designers to work together to create a next release. Information from different people in different forms must be collected aiming at a final good design. A problem occurring during product development is, how to know which people to contact for what kind of information, but that is only one. During all of the process concurrent engineering, particularly for the needs of complex very large scaled integrated system design, needs to keep everything in order and on track, while allowing people to work on many different aspects of the project at the same time with differing authorizations of control from anywhere at anytime.

For the purpose of the following discussion, need to say that we call our system a "Computer Integrated Design Control System and Method" because it encompasses the ability to integrate CIM, EDA, PDM and PIM and because it has the modularity making it possible to fulfill these needs in a concurrent engineering environment particularly useful to the design of complex very large scaled integrated systems as employed in a computer system itself. The making of these systems is a worldwide task requiring the work of many engineers, whether they be employed by the manufacturer or by a vendor, working in parallel on many complete parts or circuits which are sub-parts of these parts So as part of our development, we reviewed the situation and found that no-one that we have found is able to approach the creation of "Computer Integrated Design Control System" like ours or employ the methods needed for our environment. Our methods are modular and fulfill specific functions, and yet make it possible to integrate them within a complete "Computer Integrated Design Control System".

A patent literature review, especially one done with retrospective hindsight after understanding our own system and method of using our "Computer Integrated Design Control System" will show, among certainly others, aspects of DMS systems which somewhat approach some aspect of our own design, but are jacking in important respects. For instance, after review of our detailed description, one will come to appreciate that in modern data processing systems the need often arises (as we provide) to aggregate disparate data objects into a cohesive collection These data objects may reside at various levels of completion, spanning multiple versions and/or repositories in a hierarchical, multi-tiered data management system. Additionally, these data aggregations may need to be hierarchical themselves, in order to enable the creation of large groupings of data with varying levels of granularity for the data included therein. In such a data management system the end-users of the data aggregates are not necessarily the "owners" of all or any of the data objects comprising the data aggregate, but they have a need to manage the particular collection. Management of a data aggregation may include creating the aggregation, adding or deleting data objects, moving the aggregation through a hierarchical, multi-tiered data management system and tracking the status of the data aggregation in real-time while maintaining the coherence of the data aggregation. Creation of a data aggregation or the addition of a data object to an existing data aggregate may need to be accomplished within the data management system or via data objects imported into the data management system through application program interfaces for the data management system.

With such a focus, when one reviews the art, one will certainly find, currently, data management systems which provide means for grouping components of a data system to facilitate the retrieval thereof. However, these data management systems are insufficient and lacking because they fail to address the above-referenced need for grouping disparate data items, just to mention one aspect of our own developments.

Another example, U.S. Pat. No. 5,201,047 to Maki et al. (issued Apr. 6, 1993) teaches an attribute based classification and retrieval system wherein it is unnecessary to implement an artificial code for indexing classifications. The patent teaches a method for defining unique, user-determined attributes for storing data which are capable of being readily augmented without necessitating the modification of the under-lying query used for retrieval thereof. However, the Maki et al. patent requires that the data items being grouped share at least one common attribute to enable the grouping, and therefore fails to address the problems of managing data aggregates formed from disparate and unrelated data objects.

Other data management systems address the creation of data aggregates coupled to particular processes implemented in the data system. For example, U.S. Pat. No. 5,321,605 to Chapman et al. (issued Jun. 14, 1994) teaches the creation of a Bill of Resources table which represents the resources consumed in the performance of a given process. Attribute tables for the given resources are utilized to determine whether additional processes which will consume some or all of the resources of a given process can be initiated. The patent to Chapman et al., requires that each process to be initiated have a particular Bill of Resources aggregate associated therewith. This tightly coupled construct does not permit the creation of data aggregates not related to a particular process implemented in the data management system. Furthermore, since a process must be contemplated in order to create a Bill of Resources table, Chapman et al. do not permit the creation of aggregates without foreknowledge of the process that requires the resource. Thus, in a manner similar to that described for Maki et al., Chapman et al. require that a relationship between the elements exist prior to the formation of the Bill of Resources grouping.

Also, unrelated DMS systems are known which are used for hardware implementations which enable related data in a computer memory, storage or I/O subsystem to be physically grouped in proximity to other such data so as to improve hardware performance, application performance, and/or to solve memory management issues are known. For example, U.S. Pat. No. 5,418,949 to Suzuki (issued May 23, 1995) teaches a file storage management system for a database which achieves a high level of clustering on a given page and teaches loading related data from a secondary storage unit at high speed. The patent uses map files including a metamap file for defining page to page relations of data. These hardware implementations are not related to the present invention, as they involve the management of the physical contents of a data object rather than the management of aggregations of data objects as we perform the methods of our present invention. It is contemplated, however, that such known hardware techniques may be implemented in a system comprising the aggregation management features disclosed herein, thereby further augmenting the overall system efficiency.

During our development process we have viewed the development of others. Even the best of the EDA (electronic design automation) design houses don't have an integrated approach like we have developed.

For the purposes of this background, we will discuss some of the various approaches already used specifically viewing them in light of our own separate developments which we will further elaborate in our detailed description of our invention which follows later in this specification.

In the field of EDA, there are today several leading edge providers of Data Management technology. Among them are Cadence Design Systems, Inc., ViewLogic Inc., and Synchronicity Inc., Of course there are others, but these the companies that have the capability to provide complete data management solutions that encompass all facets of the business process including design, manufacturing, quality control, defect tracking, project management and the like. However, review of their most recent technology still affords the opportunity to make improvements in the area of scalability, modularity and adaptation of disparate environments into a seamless Data Management enterprise.

Historically many attempts have been made to manage and share data across groups of users or teams. This has typically resulted in systems that assume a particular use model and expect the users to mold their process or methodology around it. Furthermore, these systems tend to either be a closed architecture which is difficult to enhance or customize. In addition these systems can be large and complex, and lacking the ability to scale from a small team of "low-end" users to a large group of sophisticated "high-end" users.

SUMMARY OF THE INVENTION

Our invention provides a design control system usable in a concurrent engineering process which can cooperate in a distributed environment worldwide to enable a design to be processed with many concurrent engineering people and processes. The system we employ uses a data management control program tangibly embodying a program of instructions executable by a supporting machine environment for performing method steps by a data management system having a library organization which receives a request of a user initiated from said displayed client screen and fulfills the request by a providing result via our data management system. This data management system has a plurality of data managers and is provided with a plurality of data managers in one or more layers of a layered architecture. The system performs with a data manager and with a user input via an API a plurality of processes on data residing in heterogeneous data repositories of said computer system including promotion, check-in, check-out, locking, library searching, setting and viewing process results, tracking aggregations, and managing parts, releases and problem fix data under management control of a virtual control reposisitory having one or more physical heterogeneous repositories. The system provides for storing, accessing, tracking data residing in said one or more data repositories managed by the virtual control repository.

Our invention provides user interfaces for a combination of command line, scripts, GUI, Menu, WebBrowser maps of the user's view to a PFVL paradigm.

We have created a new data management architecture which is capable of being adapted to any process and methodology. It presumes no use model so multiple teams can share data without the need to follow the same use model. Our invention is also highly modular and scalable which permits different features to be installed or configured, and allows the same system to function as either a low-end or high-end DMS.

These and other improvements are set forth in the following detailed description. For a better understanding of the invention with advantages and features, refer to the description and to the drawings.

BRIEF DESCRIPTION OF THE DRAWINGS

FIG. 2B shows how the PFVL Paradigm can be adapted to multiple real life applications.

FIGS. 3A and 3B depict a complex Data Repository illustrating various means in which data can physically reside in the Data Management System.

FIGS. 5A and 5B illustrate an alternative method to implementing DMS Applications using State Tables.

FIG. 8 shows an example of how a DMS function is invoked with the standard API and is transferred through the architecture to the Control Repository Access layer FIG. 9 shows examples of Control Repository Access transactions (Note: For convenience of illustration, FIGURES may be separated in parts and as a convention we place the top of the FIGURE as the first sheet, with subsequent sheets proceeding down and across when viewing the FIGURE, in the event that multiple sheets are used.)

Figure 1:
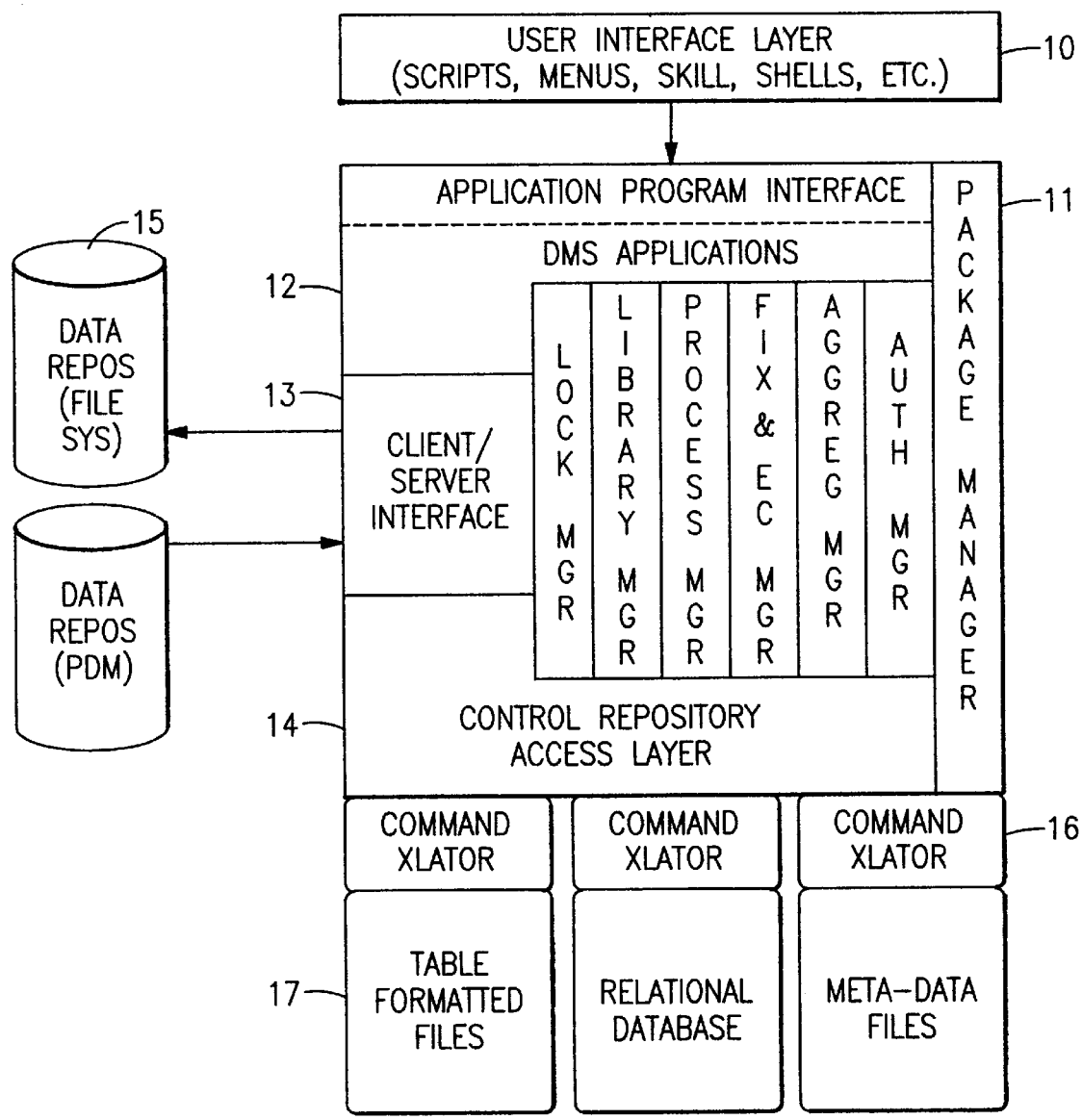
FIG. 1 shows an overview of the preferred embodiment through the use of an architectural block diagram.

Our detailed description explains the preferred embodiments of our invention, together with advantages and features, by way of example with reference to the aforementioned drawings.

DETAILED DESCRIPTION OF THE INVENTION

Modular, Scalable DMS Architecture Overview

The present invention employs a novel, layered architecture which permits the DMS to be constructed and maintained in a modular fashion. Additionally, this approach also allows the DMS to be easily scaled from a low-end client-only system to a large high-end globally distributed enterprise wide data management system. In accordance with our preferred embodiment a Data Management System has a plurality of data managers and is provided with a plurality of data managers in one or more layers of a layered architecture. The system performs with a data manager and with a user input via an API a plurality of processss on data residing in heterogeneous data repositories of said computer system including promotion, check-in, check-out, locking, library searching, setting and viewing process results, tracking aggregations, and managing parts, releases and problem fix data under management control of a virtual control reposisitory having one or more physical heterogeneous repositories. The system provides for storing, accessing, tracking data residing in said one or more data repositories managed by the virtual control repository. User Interfaces provide a combination of command line, scripts, GUI, Menu, Web-Browser maps of the user's view to a PFVL paradigm. Configurable Managers include a query control repository for existence of peer managers and provide logic switches to dynamically interact with peers. A control repository layer provides a common process interface across all managers data view maps to a relational table paradigm and maps contol repository layer (CRL) calls to sequences of SQL queries. A command translator for a relations data base provides pass through of SQL queries. Table files map SQL Queries into a set of FILE I/O's with appropriate inter I/O processing, and meta data maps SQL Queries into Meta data API calls with appropriate inter I/O processing. DMS functions and utilities include an API, and a a complete set of functions based on a PFVL paradigm. PFVL paradigm calls are mapped into DataManager(s)/Control Repository calls. The client/server interface is a common interface to a enterprise Client/Server network, and may be reduced in size for acting for a co-resident client/server. The data repository is an aggregation of disparate data storage engines. A package manager tailors the control repository and provides methodology customization with package, variance, filetype, level granularity.

Generally, by reviewing this invention, as well as the prior application it will be appreciated that we provide as described herein a modular, scalable Data Management System which uses a single paradigm to manage similar or disparate data objects in a local or distributed client/server environment. The modular implementation method disclosed herein affords the opportunity to install, implement or configure new elements to the system as the demand changes. Furthermore, the scalable nature of our system and methods permits the same DMS to grow from a simple, low-end client-only environment to a high-end fully secure client-server implementation. The improvements which we have made demonstrate how a single data management architecture can be used to adapt to virtually any methodology or process. Our processes thus provide a framework for accommodating a plurality of physical storage repositories in addition to a centralized Control Repository which can be implemented using various means.

Generally we proceed by employing a layered architecture centered around a plurality of Managers conforming to a common data classification method known as the PFVL paradigm. This flexible paradigm allows data related to hardware design, software development, inventory control, manufacturing or any other field requiring shared data management to be tracked using the same Data Management System. All objects are tracked with a centralized Control Repository and stored in a shared Data Repository.

We use our Managers and architectural layers as a framework for a plurality of applications, functions and transactions implemented in a modular fashion. Smaller transactions and functions can be combined to form larger more complex functions or data management applications. This layered implementation promotes the concept of functions and transactions which can be instantiated in a plurality of applications. The layers also permit applications to be written without explicit knowledge of the physical implementation of the Data Management System.

Adaptation of the DMS to a user environment is accomplished through a single architectural layer. This allows the architectural core, including all the transactions and functions encompassed therein to remain methodology and environmentally independent.

Our DMS allows applications to remain methodology independent through the use of a standardized application program interface. User interfaces can be constructed to customize the same DMS application several different ways to conform to user methodologies. Conversely, our invention teaches an alternative method for implementing applications using easily customizable state tables.

Our Client/Server Interface allows the elements of the DMS to interact locally in a client-only environment or via a client / server connection. The client/server implementation can be achieved in a Local Area Network, Wide Area Network or a globally distributed environment such as the internet.

Scalability of the DMS is achieved through the use of configurable Managers which can be switched on or off depending on the needs of the users. Since all the Managers conform to the PFVL Paradigm and follow a standardized application program interface, new Managers can be added to the system without the need to reconstruct or alter the existing DMS.

The physical implementation of the DMS is described in two sections which deal with the Data and Control Repositories separately. The Data Repository may be implemented using a plurality of means ranging from simple file systems to commercially available Product Data Management (PDM) systems such as RCS, Sherpa, MetaPhase, etc. The data can be physically located in a single storage medium such as a hard disk, local file system, or server, or distributed throughout a plethora of storage media scattered geographically. The centralized Control Repository can be implemented using several approaches, including but not limited to, relational or object oriented databases, flat files, meta data files or table formatted files. This disclosure describes the use of Command Translators which map generic Control Repository transactions to the appropriate access method corresponding to the physical implementation. This approach permits the information in the Control Repository to be migrated between different physical implementations. It even allows multiple physical implementations to act as a single logical Control Repository.

We will describe in the following detailed our new processes and methods with respect to the overall architecture with advantages and features next with reference to the drawings.

Overall architecture

FIG. 1 depicts the overall architecture of the preferred embodiment. The entire DMS architecture is based on the PFVL paradigm, illustrated in FIG. 2, which allows the DMS to be environment and methodology independent. All interfaces into the DMS use a standard PFVL based API which provides the flexibility to use a common DMS across several similar or disparate user groups. For example, this system could be used to manage the data for both the electrical and mechanical components in an automobile company.

Figure 2A:
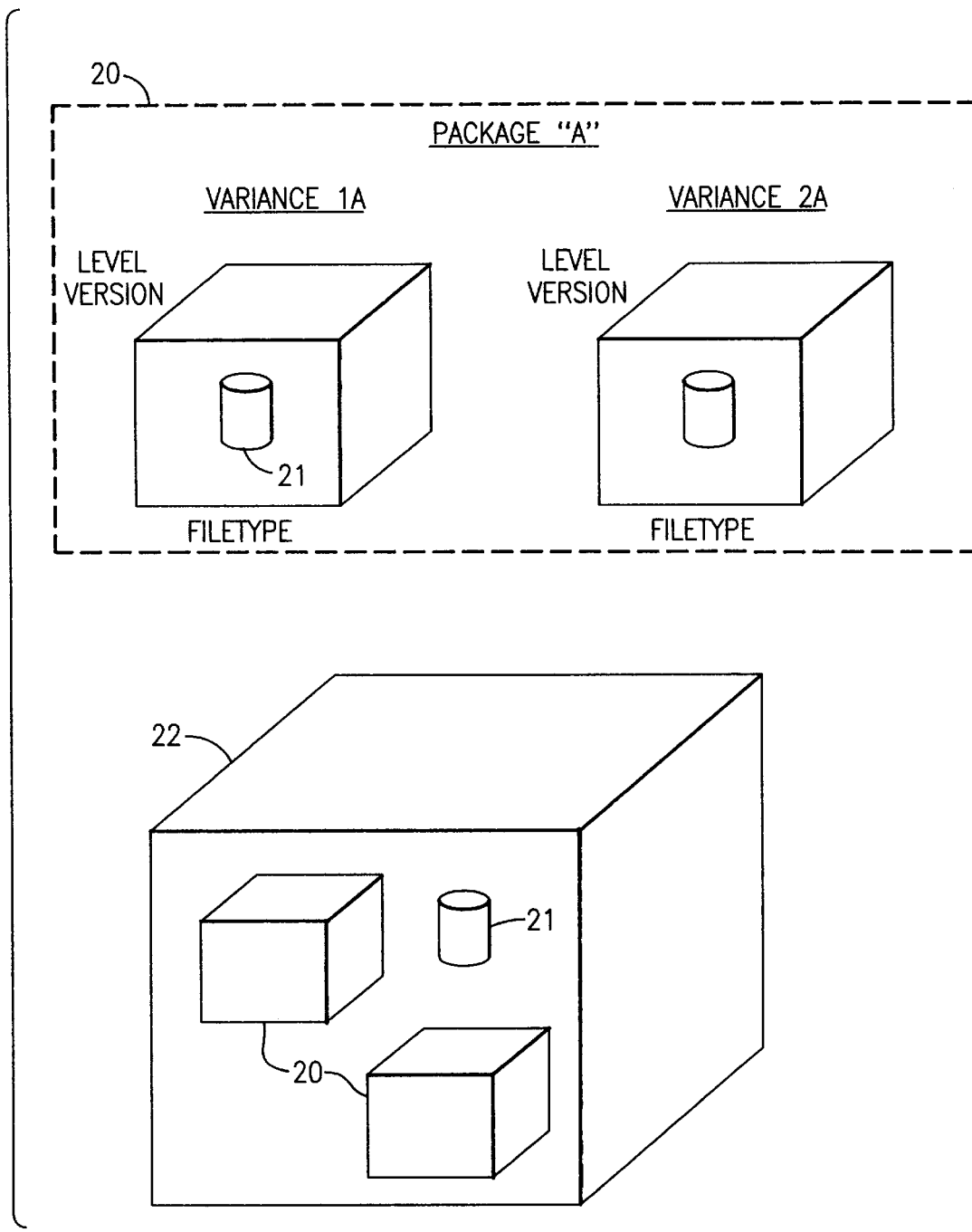
FIG. 2A shows a symbolic representation of the PFVL Paradigm for both a single Package and a grouping of hierarchical Packages.

In order to understand many of the underlying architectural concepts conveyed in this disclosure, we turn our attention to the PFVL diagram depicted in FIG. 2. FIG. 2A illustrates the PFVL paradigm through the use of a multi-dimensional symbol such as a cube. The present invention teaches the notion that all objects resides in a Data Management System can be classified according to five basic attributes:

Package An arbitrary grouping of data objects that has some relationship. or common bond with each other. Each package contains one or more variances.

Variance One or more objects within a package that, when combined with the remaining objects in the same Variance or from one or more dependent Variances, comprise a coherent and meaningful collection of objects.

Level A collection of objects, within a Variance, that have achieved some arbitrary degree of quality.

Filetype A collection of objects sharing the same data type or format.

Version An iteration of a data object

As an example, FIG. 2A depicts Package "A" (20) comprised of two Variances. Within each Variance are one or more data objects (21) of a given Filetype, residing at one or more Levels, with one or more Versions of the object. In the simplest case, a single Version of a single Filetype exists at a single Level within a single Variance of a single Package. Our invention achieves tremendous flexibility by allowing any of these attributes to be expanded n ways. By varying the dimensions of the cube, and the number of cubes in the Package, one can create a DMS capable of managing data in almost any environment.

The present invention also permits Packages to be arranged hierarchically. This is illustrated at the bottom of FIG. 2A where Package "A" (20) is embedded within a higher level Package (22). The higher level Package may also contain its own data objects (21) as shown in the figure. This is possible because each Package in the hierarchy has its own set of PFVL attributes. For example, a printed circuit board could be considered a high level Package comprised of various ASICs, resistors, capacitors and connectors. The ASICs on the board could be considered Packages themselves, where each ASIC Package is comprised of the underlying circuit designs.

FIG. 2B contemplates two examples of how the PFVL Paradigm can be implemented in actual applications. The first table (23) demonstrates a typical electrical engineering design environment comprised of design objects dispersed in the DMS. The primary design object is an MPEG design consisting of multiple versions of a schematic residing in the "dsgn_lib" design library. This library also contains a VHDL object for the MPEG design. It can also be seen that the dsgn_lib library contains two Levels, Test and Prod. Versions of the MPEG schematic simultaneously exist at both Levels. Most of the objects are classified under the Universal Serial Bus (USB) Variance, except for a PCI Variant of the MPEG schematic. Our invention allows Variances to be completely independent or dependent upon other Variances. In this example, if the PCI Variance is based on the USB Variance, then all objects in the USB Variance can be picked up and used in the PCI Variance, unless they need, to be modified DMS Table 23 also illustrates an additional object, the Bus Controller, which also resides in the PCI Variance of the dsgn_lib library. Finally, the diagram illustrates an MPEG Layout which resides in a separate Package known as the Circuits library.

The second DMS Table (24) in FIG. 2B shows how the same PFVL paradigm can be used to track objects and sub-assemblies in an automotive environment. In this case, Packages are used to denote the Cooling and Engine sub-assemblies as well as the Electro-Mechanical main assembly. Within each sub-assembly are one or more components described in the form of schematics, layouts and VHDL, and residing at quality levels QA1, and QA2. Also, some components exist under distinct Variances in order to accommodate two different automobile models.

Returning to the overall architectural diagram identified as FIG. 1, the top layer is the User Interface Layer (10). This layer makes possible such scenarios as sharing electrical and mechanical design information by acting as an environmental adapter. An example of such an adaptation is present in a large electronic design organization where several design groups need to share data among several libraries. A common DMS application in this scenario would be a Check-In operation which allows data to enter the DMS from a user's private work space. Since the DMS accommodates several design groups using numerous libraries, the DMS Check-In application's API requires one of the invocation parameters to be the Package. If the methodology requires all the designers on a team to check their data into a single library, the User Interface Layer may employ a local "wrapper" or user utility which only requires the user to enter the name and type of design object being checked in. This wrapper then passes this information to the DMS Check-In application. It also supplies the sole library name as the Package as well as a hard-coded Level and Variance.

To further demonstrate the advantage of the User Interface Layer, consider a second design group which also uses the same DMS to manage their data. Unlike the first design team, this one designs sub-assemblies in which each sub-assembly is treated as a Package. Since this team requires access to multiple packages, their Check-In function may consist of a "wrapper" in the User Interface Layer which invokes a menu that permits the user to specify a Sub-Assembly name. The wrapper then calls the same DMS Check-In application used by the aforementioned design group. However, this wrapper passes the Sub-Assembly name as the Package rather than hard-coding it like the first wrapper.

One skilled in the art could easily envision how the User Interface Layer can employ several methods such as, but not restricted to, wrappers, shell scripts, batch files, command line interfaces, graphical user interfaces, web browsers, menus, or voice activated systems, which would be customized to the user's environment or methodology. The advantage to this approach is it allows different methodologies or processes to utilize the same underlying Data Management System. In addition, if an existing methodology changes, the underlying DMS functions remain intact. Only the functions in the User Interface Layer need to be modified to accommodate the new methodology.

Returning to FIG. 1, our preferred embodiment contemplates the use of several layers which comprise the core architecture of the DMS. Spanning three of the layers are the DMS Managers (11). These are comprised of a plurality of functions, some of which belong to the DMS Application, Client/Server and Control Repository Access layers. By grouping these functions into isolated Managers with standardized interfaces, a great deal of modularity is achieved. Furthermore, these functions can be combined to form larger, more complex, applications. Consider the following portion of an example promotion application which illustrates one way to deploy a modular DMS:

```
if (Lock_Manager_Installed) {
    query Control Repository for any locks that exist on the file
    if (locks_exist) fail the promote
} if (Authority_Manager_Installed) {
    query Control Repository to see if user has authority to do the promote
    if (user_not_authorized) fail the promote.
} if (Process_Manager_installed) {
    query Control Repository to see if any Library Processes need to run
```

-continued

```
if (library_processes_exist) invoke them and wait for completion
}

Check Promotion Criteria
Tell Control Repository to update level of the file
Perform necessary update to data repository (move file, update link, etc.)
```

Within each code branch one or more Manager functions are invoked to perform the necessary DMS operations. By combining these functions together in an algorithmic way, one can achieve highly complex DMS applications. Furthermore, one can see how modularity can be achieved using the if statements to test the Control Repository for existence of a particular Manager. This permits Managers to be installed or configured in a "plug-n-play" manner simply by setting switches in the Control Repository.

One could also envision an alternate embodiment where all the functions within each manager are compiled into independent objects. A DMS vendor or supplier could then construct customized DM systems based on the customer's needs, simply by linking together the required modules. For example, customer A may only require basic data management services so the DMS provider would only link the object code from the Library, Package and Lock Managers into a "lite" version of the DMS. Customer B, on the other hand, may require use of applications involving aggregations (configurations) and Library Processing. This customer's DMS would link the object code from the Library, Package, Lock, Aggregation and Process Managers. Regardless of the implementation method, one skilled in the art can clearly envision the advantages afforded by such a system since enhancements or changes to functions in one Manager don't require the entire DMS to be re-compiled, or redistributed.

FIG. 1 also depicts the DMS Applications layer (12) which contains all the standard utilities that a user needs in order to interact with the DMS. This includes things like Check-In, Check-Out, Promotion, Locking, Library Searching, creating and tracking an aggregation or configuration, and setting or viewing process results. These utilities are described further is this disclosure as either functions residing within a particular Manager, or applications which consist of one or more functions, confined to a single Manager or involving a plurality of Managers. All functions and applications within this layer follow a consistent, standardized Application Program Interface which allows them to remain isolated from any user environment or methodology. This feature of the invention allows a single DMS to be deployed through several user groups performing similar or disparate work, yet having the need to share data between them.

In the preferred embodiment, all functions and applications communicate with the Control and Data Repositories through the Client/Server Interface (13) layer. This is an expandable or contractible layer designed to allow either communication between the various layers in a client-only environment or between clients and one or more servers existing anywhere in a global enterprise. The same set of Manager functions, DMS applications and Control Repository Access routines are utilized regardless of the client/server topology.

All communication into the Client/Server interface layer is directed to either the Control Repository Access Layer (14) or the Data Repository (15). The Control Repository Access Layer consists of one or more "transactions" which perform simple or complex operations against the Control Repository (CR) itself. These can typically be categorized as adding information to the CR, modifying existing information in the CR, deleting information from the CR, or extracting (and potentially filtering) information out of the CR. Regardless of the type of operation, all transactions in this layer are written as if the Control Repository is a single virtual repository consisting of tables organized around the PFVL paradigm. This approach allows different physical implementations of the Control Repository. It even permits a plurality of physically different implementations to appear as a single virtual Control Repository.

Our invention further contemplates a virtual Data Repository (15) comprised of one or more physical repositories. The underlying repositories can be a simple file management system such as the Distributed File System (DFS) or a simple directory structure organized on a hard or floppy disk. Correspondingly, the data repository could be constructed using proprietary or commercially available storage engines or PDM products such as RCS, Sherpa, MetaPhase, SCCS, CMVC, and ClearCase. Furthermore, the present invention permits Automated Library Machines, such as those disclosed in P0996-0010 to be employed as Data Repositories. As shown in FIG. 1, all communication with the Data Repository is performed through the Client/Server Interface layer, which permits the Data Repository to be locally accessible to the client, or distributed anywhere in the global enterprise on a remotely accessible server.

FIG. 3 depicts a complex Data Repository comprised of Data Repository A (30) which is a simple unix directory where the files in the DMS may reside. Additional data may be stored in Data Repository B (31) which is a commercially available PDM such as RCS or Sherpa. Although these storage engines automatically handle revision control whenever a user checks data into or out of the system, the preferred embodiment maintains it's own unique file identifier in the form of a File Reference number within the Control Repository. The main reason for this is that it allows all data in the DMS to be tracked in a similar fashion regardless of the physical storage method employed Furthermore, if the data ever needs to be transplanted from one storage engine to a completely different one, the operation can be accomplished by checking the data out of the old storage engine, checking it into the new one, and updating the associated Control Repository table which maps the File Reference number into a revision number. Since all information associated with the object is tracked by PFVL and File Reference number, the information is kept completely in tact even if the old and new storage engines use completely different revision control methods. Returning to FIG. 3, Data Repository C (32) could be a physical location on a server accessible via a Universal Resource Locator (URL) on the World Wide Web (WWW). Although all data in this system is stored using a variety of means, the PFVL Paradigm serves as the common storage model such that any client (33) can interact with the data. Furthermore, data is directed to the appropriate Data Repository through the use of the Data Repository Table (34). It clearly illustrates how the PFVL attributes can be used in any combination to segregate the data into one or more physical repositories. For example, all VHDL in the MPEG design library will be stored in Repository B which represents one of the commercial revision control engines such as RCS or Sherpa. Wiring Layouts for the Rel_1 Level of the Base Variant of the MPEG design library are stored in a DFS directory represented by Repository A, and customer documentation for the MPEG design is stored in a publicly accessible URL represented by Repository C.

One skilled in the art will also note that the use of wildcards in conjunction with the PFVL attributes permits a great deal of granularity in storage partitioning. The example shows a wildcard (*) in the Filename field, but this could also be filled in with a specific file or a family of files matching a certain pattern. Additional fields could also be added to the table such as a Version field to allow data to be physically segregated by version or File Reference numbers, or number patterns. This approach offers the advantage of being able to not only use different storage methods for different types of data, but also solves problems associated with large, incompressible, files filling up physical storage media. This problem is prevalent in many commercial available data management systems which require either entire libraries or entire releases of data to be physically stored using the same means under a common directory structure.

Returning to FIG. 1, the bottom of the diagram shows the Control Repository (17) which can be implemented using a multitude of methods, including, but not limited to, Table Formatted Files, Relational or Object Oriented Databases, or Meta-Data files in any format. Our invention also permits one or more of the above implementations to be used simultaneously to comprise a single virtual Control Repository. Regardless of the physical implementation of the Control Repository, all information is organized under the PFVL paradigm such that any entry in the repository directly or indirectly maps to one or more PFVLs. This permits users to access information about any object residing in any Package or library, at any Level or Variance regardless of whether that piece of information exists in a relational database, a simple ASCII file or a binary encoded MetaData file. Information can be freely reorganized or transplanted between different Control Repository implementations without the need to modify any DMS Applications, Manager functions or Control Repository Access transactions. Tables support underlying Manager functions and DMS Applications.

A key player in enabling the aforementioned feature are the Command Translators (16) which interface between the Control Repository Access Layer and the Control Repository (17). Each physical implementation of the Control Repository would employ a unique Command Translator to map the generic Control Repository Access transaction into the appropriate command to satisfy the physical repository. For example, a relational database may be able to accept the Control Repository Access transaction "as is" or with a simple syntax modification while a binary encoded Meta-Data file would require a function capable of parsing and manipulating the MetaData file.

In a similar manner to the Data Repository, this approach also enables a great deal of flexibility in upgrading the Control Repositories or permitting data from disparate sources to appear as one logical repository. For example, a SQL database may be employed as the primary Control Repository which includes all information necessary to track each object in the DMS by File Reference, PFVL, physical location, etc. This repository may also contain a Part Number table for all the manufactured pieces of a product. Off to the side might exist a Lotus Notes database containing service call or defect repair information organized by Part Number for the same product. Our invention would allow Control Repository Access transactions to be written, using an identical SQL-like syntax, to extract design information about the part from the SQL database and repair actions from the Lotus Note database. This way someone with no knowledge of the underlying Control Repository structure could write a DMS Application to invoke said functions and create a customized report containing information from both databases. The Command Translators would be responsible for mapping the generic transaction for the design information into a true SQL, command, and mapping the repair action transaction into a Notes transaction.

DMS Application Layer

Our invention contemplates an architectural layer dedicated to the various DMS Functions and Utilities that a user invokes to manipulate the Data Management System. Common functions found in this layer include, but aren't limited to, Check-In, Check-Out, Promote, Setting Locks, Checking Authorities, etc. Furthermore, these functions share a consistent application program interface (API) following the PFVL paradigm, which allows this layer to remain methodology and environment independent.

Figure 4:
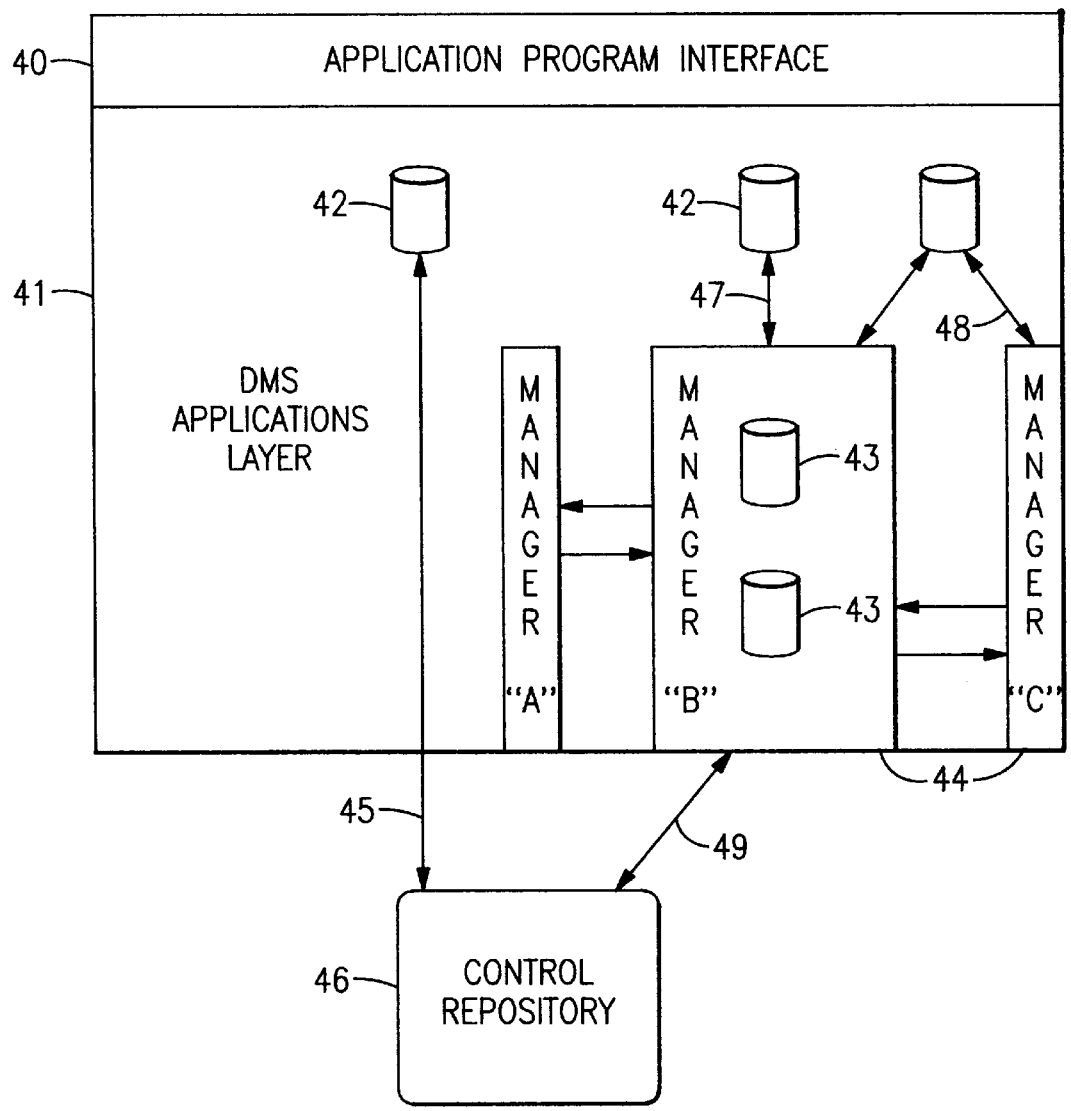
FIG. 4 shows a detailed diagram of the DMS Application Layer introduced in FIG. 1.

FIG. 4 conveys the preferred embodiment of this layer. The DMS Applications Layer (41) is comprised of all the applications that enable a user to interact directly with-the DMS. Each application consists of one or more application modules (42) which may or may not interact with the various Managers (44). FIG. 4 depicts various scenarios involving the interaction with the application modules:

Non-Manager Interaction (45) An application may desire to interface directly to the Control Repository (46) without the need to interact with any Managers. An example might be a function which extracts project management data from the Control Repository and displays it in a formatted report.

Single Manager Interaction (47) An application may only need to interface with a single Manager in order to execute all the steps in the application's algorithm. For example, an application which associates an object to a problem fix number only requires functions within the Problem Fix/EC/PN Manager.

Multiple Manager Interaction (48) Often application algorithms require interaction with a plurality of Managers. For instance, a promotion algorithm may interface with the Authority Manager to determine if the user has the proper promote authorization. Next, it may execute Process Manager functions to determine if the object meets the necessary promotion criteria. Finally, it may interface with the Library Manager to perform the actual promotion to the next level.

Control Repository Coupled with Manager Interaction (49) Any combination of the above methods may be used to construct an application which interacts with one or more Managers in addition to the Control Repository. For instance, an application may query the Control Repository to see which Managers are currently installed in a user environment, and use that information to branch through various parts of the algorithm which interface with the Managers.

Within each Manager, FIG. 4 depicts one or more Manager Functions (43) which combine to form a library of utilities upon which applications can be constructed. For example, the Problem Fix/EC/PN Manager contains:

Functions to associate objects to Problem numbers

Functions to associate Problem numbers to releases

Functions to associate Part Numbers to objects

Together these modules form a library of functions within each Manager, upon which application developers can create more complex utilities.

FIG. 4 also depicts an Application Program Interface (40) common to all applications and functions In the DMS Application Layer. The API is based on the PFVL paradigm. By requiring all the functions to conform to the PFVL paradigm they remain methodology independent while retaining the flexibility to be adapted to any user environment through the use of the User Interface Layer. Our preferred embodiment requires all functions in this layer to be invoked by passing package, file type, variance, and level as the minimum amount of information. Additional information such as filename, iteration, or run-time options may also be supplied. Our embodiment also permits the wildcard character (*) to be used on any combination of PFVL attributes. For instance, if a wildcard is passed in place of the level, then all information matching the remaining PFVL attributes at all levels is accessable. The wildcard can be combined with a partial PFVL attribute in a similar manner. In this case, a level attribute of prod* would access all information matching the remaining PFVLs at any level beginning with prod. Finally, a placeholder such as the percent (%) character can be used to ignore any attribute. Certain DMS applications may not require information regarding all the PFVL attributes, so use of the % character allows every DMS application to use an identical API to facilitate interaction with the user environment. For example, the following API could be used to interface with all DMS applications regardless of their underlying function:

DMS_App_Name <filename> <filetype> <package> <variance> <level> <options>

If a user environment doesn't necessitate the use of all the PFVL attributes, the user interface layer can suppress or hard-code them prior to invoking the underlying DMS application. For example, a user environment may exist such that variances aren't applicable and data only resides in two levels of a single package (library). Furthermore, the current process only permits users to check data into the DMS at the lowest level. The corresponding user interface may be a simple menu where the only two fields the user enters are the file name and file type. The underlying user interface code would automatically pass the sole package and level, and hard-code or suppress the variance to the DMS check-in API. The advantage to the present invention is in the event the process changes to allow users to perform additional actions, such as checking data into the second level, only the user interface needs to be updated Neither the underlying DMS applications nor the information in the Control Repository need to be updated.

Our invention permits any combination of these functions, or any other functions in this or any other Manager, to be referenced by any application or by other functions in this or any other Manager. The modularity afforded by this approach results in novel implementation techniques. The present invention allows the various steps of our promotion algorithm to be broken down into modular pieces of code whereby some constitute Manager Functions while others comprise the promotion application. Although the Manager Functions tend to be small enough to lend themselves to conventional procedural programming techniques, the application code itself may or may not.

Although conventional procedural code can be used to implement any application in our DMS, the length and complexity can lead to difficulties in debugging or maintaining the code. One of the advantages of our modular DMS is it permits alternative techniques for implementing complex application algorithms. FIGS. 5A and 5B describe an alternative method using state tables. FIG. 5A shows an example promotion algorithm implemented using State Table (51) which is comprised of 12 steps. This table illustrates a full promotion where each step interacts with one or more Manager functions, including steps 6, 7 and 9 which interact with the Process Manager to invoke Library Processing. Each step has 2 Next State columns associated with it. The primary Next State column (labeled GOOD), indicates the next step which should be undertaken if the result of the present step is successful. The secondary Next State column (labeled BAD) indicates the state transition if the present step results in an unacceptable result.

In addition to making it very simple to follow the algorithmic flow of the promote, this method also presents the advantage of simplified customization. State Table (52) illustrates the ease by which the promotion application can be updated to eliminate the Library Processing. This is accomplished by simply changing the Next State columns for steps 4, 5 and 8. to bypass steps 6, 7 and 9. Furthermore, State Table (53), in FIG. 5B, demonstrates how the DMS application can be modified to completely omit steps 6, 7 & 9 and renumber the remaining steps for simplicity.

An additional advantage of the State Table method for DMS applications is code maintenance and deployment. Since these tables can exist in a simple ASCII format, one could make changes to the application flow without the need for formal programming education. Furthermore, one skilled in the art could envision how the state tables could be executed by an interpreter such that the application code could be changed dynamically by the user without the need to recompile any code modules in the DMS. This novel approach to implementing complex data management applications yields an improved method for deploying a general purpose DMS to a large customer base, yet allowing more sophisticated users to customize the applications. This improves upon the current state of the art by eliminating the need for the DMS provider to maintain a plurality of customized DM systems to satisfy a multitude of customer environments variations.

Client/Server Interface

The present invention contemplates the use of a Client/Server Interface embedded between the DMS Application and Control Repository Access layers. All communication between the DMS applications and the Control Repository functions is performed through special interface routines. These routines are responsible for locating the proper Control Repository, making the connection, and passing the appropriate information to the underlying Control Repository Access function. This feature allows a completely scalable DMS ranging from a low-end DMS where the Control Repository is directly accessible from the user's client to a high-end enterprise DMS where the Control Repository can be literally spread across a plurality of worldwide servers. For the low-end implementation, the client/server routines simply pass the required information from the DMS application to the CR Access function, much like a parent module invoking an external function or subroutine. In the high-end scenario, the routine would locate the server where the appropriate CR resides, make the appropriate connection and pass the information to the CR function.

In addition to controlling the interface between the DMS applications and Control Repository, the client/server interface also controls access to the Data Repository. Once again, a low-end system may exist whereby the data resides in a file system directly updatable by the user's client. For example, during a Check-In process, the client would physically copy the data from the source location to the actual data repository. This could be accomplished by providing write access to the data repository for all users, or writing a client/server routine which utilizes techniques such as Unix setuid bits to ensure that data can only be written to the repository via the proper DMS applications. In the high-end scenario, the client/server routines could establish a connection with the server where the data repository resides and employ the server to perform the appropriate file operation. This implementation lends itself to a more secure DMS since access to the data repository can be very tightly controlled, and user clients can not directly update the data repository outside of the DMS either intentionally or accidentally.

Figure 7:
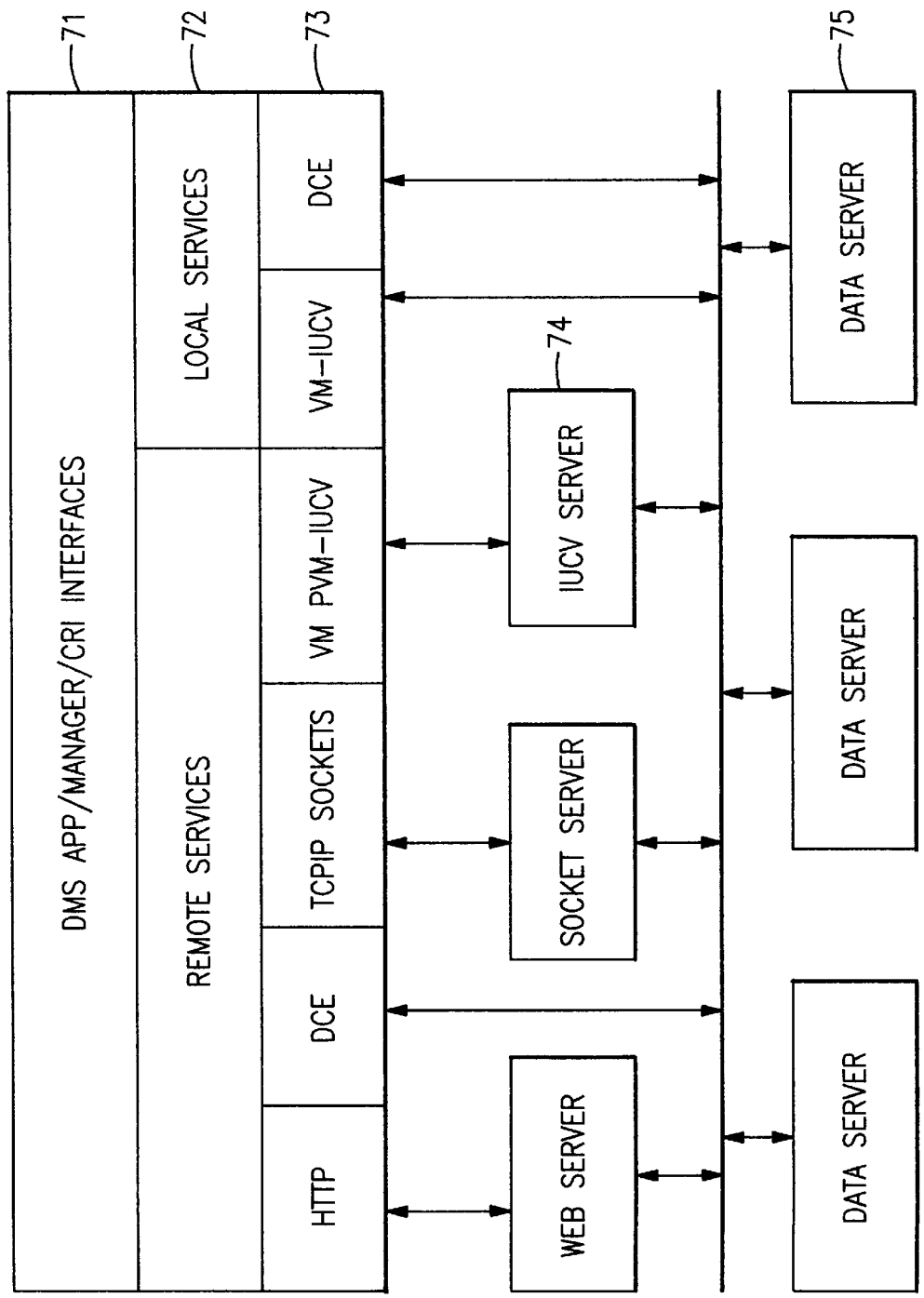
FIG. 7 describes the detailed architecture of the Client/Server Interface layer.

Referring to FIG. 1, the DMS applications (12) and the Various Managers (11) as well as the Control Repository Interface (14) all communicate with the Data Repository (15) and the Control Repository (17) via the Client/Server Interface (13). This interface is depicted in FIG. 7, where the DMS applications, the various Mangers and the CR interface layer is shown (71). Depending on the location of the server, i.e. local or remote, the respective Communications Services (72) are invoked. These services support a variety of protocols including but not limited to those depicted in the (73) layer. Some of these services communicated either directly to the Data Servers (75), through the network and or the severs depicted at the (74) layer.

As an alternate embodiment for this layer, Automated Library Machines (ALM) are employed in a "batch" environment which permits a large number of DMS operations to be queued and processed by these virtual machines. The Client/Server routines are responsible for creating work requests on the user's client and transmitting them to the appropriate ALM for processing. Use of ALMs also provides the advantage of breaking up large complex DMS applications into foreground and background pieces. The foreground portion runs on the user's client, then a work request is created and transmitted to the ALM through the Client/Server Interface. Upon receipt of the work request, the ALM processes the background portion of the DMS operation, including all file manipulations. Since the foreground portion tends to comprise a series of checks as opposed to intensive computing, improved client throughput can be achieved by offloading the more compute intensive portions of the DMS application to the ALM.

Control Repository Access Layer

Our invention contemplates the use of a separate Control Repository Access Layer comprised of a library of functions or transactions which extract, add, modify or delete information from the Control Repository. There are two main advantages to separating this code from the functions comprising the DMS Application Layer:

1. Many transactions can be used in multiple DMS applications, so in an effort to modularize the code and prevent duplication, one skilled in the art could envision how these transactions can be instantiated in DMS applications much like a logic designer instantiates circuit macros.
2. In larger DM systems where performance is a critical issue, it is frequently to combine several smaller transactions into "macro" transactions. This is best performed by someone with intimate knowledge of the internal organization of the Control Repository. By separating the CR Access functions from the DMS applications, the end users can readily modify the DMS applications without acquiring the aforementioned knowledge.

An illustration of the above principles can be made using a translation from an API call down through multiple managers to the command translators.

Assume that usera wishes to set a move lock on file1.type2.varx at the entry level for the purpose of MODEL BUILD. The user would invoke the API call SetLock move file1 type2 varx entry "MODEL BUILD". Referring to FIG. 8, the API call is represented (81). The state table (82) is used to convert the API call into invocations of the Authority Manager File Authority Check (83) and the Lock Manager SetLock (84) routines.

FIG. 9 depicts the Control Repository Interface (CRI) call (91) employed by the Authority Manager to perform the File Authority Check. This in generates the SQL transaction (92). In addition, FIG. 9a depicts the CRI call (93) employed by the Lock Manager to perform the lock set. This generates a sequence of three SQL transactions (95). It should be noted that all CRI calls are atomic, i.e. All SQL transactions in a CRI call must complete successfully. If one transaction fails, all previously completed transactions are backed out.

Command Translators

Our preferred embodiment also depicts all Control Repository Access functions to be written in a common generic form, adhering to the fundamental concept that all Control Repository information is organized in virtual tables. This also holds true for transactions that reference information residing in a Control Repository which is not physically implemented using tables. The Command Translators serve as the interface to the physical embodiments of the Control Repository.

An example of the above architectural principle is described herein. All CR Access functions are written as a series of add, modify, delete or extract operations in a SQL-based language that treats the information as if it were stored in SQL tables. If the underlying Control Repository is indeed a SQL database, the command translator passes the transaction to the database with little or no modification. However, if the information is organized in a flat file, the command translator would map the virtual table to the physical organization of the file.

Figure 6:
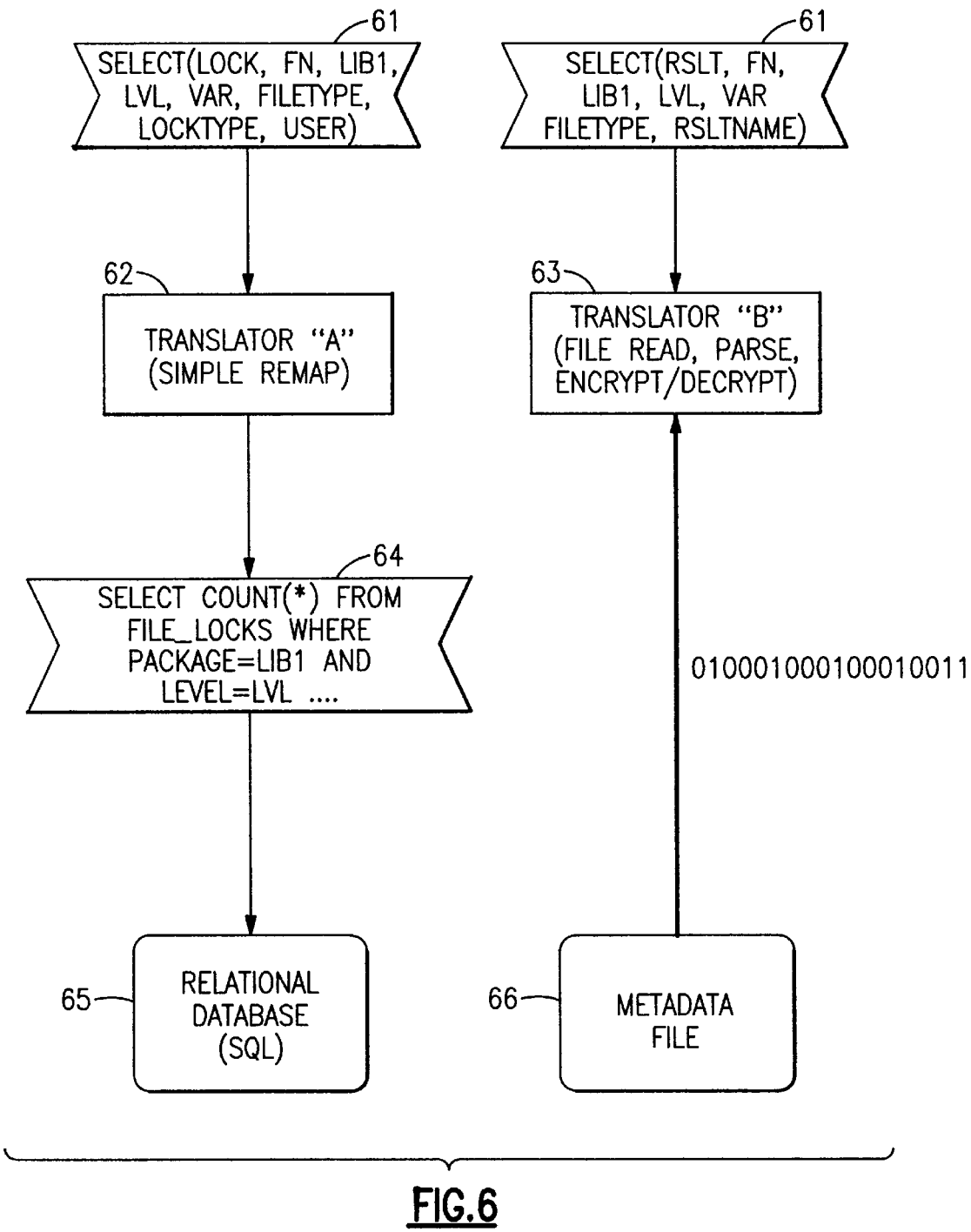
FIG. 6 depicts the detailed operation of the Command Translators introduced in FIG. 1.

FIG. 6 depicts a scenario where the virtual Control Repository is physically comprised of a SQL database (65) and an encrypted metadata file (66). Command Translator A (62) simply passes the generic SQL-based transaction (61) to the SQL database after a simple modification into a true SQL transaction (64). Conversely, transactions destined for the meta-data file are sent to Command Translator B (63). Inside this translator, the met-data file is parsed using the proper decryption technique to locate the data that maps to the generic Control Repository information contained in the transaction. In the case of an add or modify operation, the new information is encrypted and embedded in the appropriate position within the file. This architectural approach permits information residing in existing meta-data, or non-DMS data-bases to be included as part of the centralized DMS Control Repository by simply writing a command translator to perform the mapping between the generic (repository independent) transaction and the interface to the physical repository.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A method for a data management system having a plurality of data managers, comprising the steps of providing said plurality of data managers in one or more layers of a layered architecture, and performing with a data manager and with a user input via an API a plurality of processes on data residing in heterogeneous data repositories of said computer system including promotion, check-in, check-out, locking, library searching, setting and viewing process results, tracking aggregations, and managing parts, releases and problem fix data under management control of a virtual control repository having one or more physical heterogeneous repositories, and storing, accessing, tracking data residing in said one or more data repositories managed by said virtual control repository, and wherein said virtual control repository comprises virtual tables and all virtual control repository access functions are implemented as transactions constructed using a generic SOL-based structure, and command translators are employed to map generic SQL-based virtual control repository transactions into any required command interface needed to interact with the corresponding physical implementation of said virtual control repository.

2. The method according to claim 1 wherein any type of data can be mapped into a package, Filetype, variance and a PFVL Level whereby within a variance there exists one or moire data objects of a given type residing at one or more levels with one or more versions.

3. The method according to claim 2 wherein packages are hierarchical and contain other Packages, and wherein a given package can contain any combination of data objects and/or packages.

4. The method according to claim 1 wherein said plurality of to claim 1 comprising a plurality of data managers are configurable and can be dynamically or statically combined as modules of a scalable system ranging up to a high-end enterprise wide DMS.

5. The method according to claim 1 wherein is provided a User Interface Layer for interaction with said user via said API which enables mapping of a methodology, process, use-model or environment into a generic PFVL paradigm using tools which can be manipulated by said user, including menus, GUIs, Web Browsers, command line interfaces, and scripts.

6. The method according to claim 1 wherein is provided with one or more DMS application layers which contains utilities that a user requires to interact with the DMS processes of promotion, check-in, check-out, locking, library searching, setting and viewing process results, tracking aggregations, and managing parts, releases and problem fix data.

7. The method according to claim 1 wherein data is stored in one or more data repositories constructed with one or more tools including simple directory trees, commercially available PDMs (storage engines), and the WWW and each repository may employ a common or unique storage and data access method.

8. The method according to claim 7 wherein each data object is classified by PFVL and unique File Reference regardless of the physical data repository in which the data object resides.

9. The method according to claim 6 wherein said DMS application layers contain applications, each of which is composed of one or more application modules which interact with the data managers in one or more ways of interaction including:

non-manager interaction;

single manager interaction;

multiple manager interaction; and control repository access coupled with manager interaction.

10. The method according to claim 9 wherein said DMS applications and data manager functions can be accessed using a common API based on the PFVL paradigm whereby all functions require a minimum of package, Filetype, variance, and level but may permit additional optional parameters, and any combination of wildcards or placeholder characters may be used on any of the parameters.

11. The method according to claim 1 wherein complex applications are constructed using state tables to invoke pre-defined functions contained in one or more data managers thus permitting applications to be to be executed in an interpretive manner and allowing them to be customized or altered in the field without the need to recompile any object code.

12. The method according to claim 1 wherein said virtual control repository's physical repositories include relational databases, object oriented databases, flat files, table formatted files, meta data files and proprietarily formatted files and said Control Repository classifies all data according to the PFVL paradigm.

13. The method according to claim 1 further comprising a scalable client/server interface permitting the DMS to use local services to run in a client-only mode and permitting a combination of local & remote services to run in a fully secure distributed client/server mode.

14. The method according to claim 1 wherein said virtual control repository is accessed by an application via an access layer which segregates transactions used to store, access or modify CR information from the DMS Applications this permitting a library of transactions to be shared among a plurality of DMS Applications and wherein said transactions may reside within one or more Managers.

* * * * *